(12) United States Patent
Rachabathuni et al.

(10) Patent No.: US 8,583,765 B1
(45) Date of Patent: Nov. 12, 2013

(54) OBTAINING INFORMATION FOR A WIRELESS CONNECTION

(75) Inventors: Sailesh Rachabathuni, Santa Clara, CA (US); Kenneth P. Kiraly, Menlo Park, CA (US); Christopher S. A. MacGregor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 12/881,487

(22) Filed: Sep. 14, 2010

(51) Int. Cl.
*G06F 13/00* (2006.01)

(52) U.S. Cl.
USPC .......................... 709/219; 709/225; 709/227

(58) Field of Classification Search
USPC ......... 709/217, 219, 223, 225, 227, 228, 229, 709/250
See application file for complete search history.

(56) References Cited

U.S. PATENT DOCUMENTS

| | | | | |
|---|---|---|---|---|
| 6,882,648 B2 * | 4/2005 | Kobayashi | ................. | 370/395.1 |
| 7,444,158 B2 * | 10/2008 | Shitama et al. | ............... | 455/512 |
| 7,769,887 B1 * | 8/2010 | Bhattacharyya et al. | ..... | 709/238 |
| 8,169,935 B2 * | 5/2012 | Taaghol et al. | ............... | 370/254 |
| 2005/0050318 A1 * | 3/2005 | Alone et al. | .................. | 713/155 |
| 2010/0322124 A1 * | 12/2010 | Luoma et al. | ................. | 370/311 |

\* cited by examiner

*Primary Examiner* — Viet Vu
(74) *Attorney, Agent, or Firm* — Lee & Hayes, PLLC (57) ABSTRACT

Electronic devices may locate and test wireless networks that are available, and may establish connections with no or minimal user intervention. The electronic device may periodically transmit a datagram to a connection server, providing updated information as to the network address of the electronic device as well as maintaining a pathway through intervening network devices. The connection server may then initiate a connection via this pathway with the information provided in the datagram.

25 Claims, 8 Drawing Sheets

OBTAINING INFORMATION FOR A WIRELESS CONNECTION

BACKGROUND

Electronic devices, such as electronic book reader devices ("eBook reader devices"), cellular telephones, portable media players, desktop computers, laptops, tablet computers, netbooks, personal digital assistants, and the like, may use wireless networks to access network resources. Traditionally the determination and selection of wireless networks has been inconvenient, requiring user attention and input. Furthermore, the itinerant nature of such electronic devices may render them inaccessible to servers due to changing network addresses, firewalls, and so forth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, electronic devices may rely upon network connections for communication. These network connections may be wired or wireless. Wireless communication may extend from a wireless local area network (WLAN), such as WiFi, to wireless metropolitan area networks (WMAN), such as WiMax, to wireless wide area networks (WWAN), such as 3G and 4G cellular systems.

At a given location, many networks may be available. For example, while sitting in a downtown restaurant, a user may be within usable range of several WLANs, a WMAN, and several WWANs. Connecting to wireless networks may require the user to enter connectivity information into the user's device, such as IP configuration settings, encryption parameters and passwords, and so forth. Similarly, connecting to different wired networks may call for entry of connectivity information as well.

Such entry is time consuming, prone to error, and may be inconvenient and frustrating to a user who simply wants to access network resources. Furthermore, given that this process of configuration is prone to error, the likelihood that users will request help configuring their devices to connect to wireless networks also increases. This, in turn, increases support costs associated with the connectivity.

To further complicate the issue, a device may change access points or even networks once connected. This is particularly acute when the device is mobile and accessing short range WLANs and medium-range WMANs. Thus, traditionally the user was faced with constantly entering connectivity information when moving into range of a new wireless network. This can be frustrating to the user, and acts as a disincentive to use WLANs and WMANs. As a result of this difficulty in accessing WLAN and WMAN resources, the device may be left to rely on WWAN connectivity, which may be more expensive, provide less bandwidth, draw more power from the device, and so forth.

Because of the limited geographic coverage of WLANs and WMANs, the device may move from one network to another. Often, each network to which a device connects provides a different network address to the device. Furthermore, each of these networks may incorporate different network devices such as firewalls, proxy servers, routers, network address translation devices, and so forth, each with different configurations. The network devices may be configured to modify or block inbound communications, such as those from an external server destined for the device connected to the network. The network devices may restrict or block some types of output communications as well, allow only communication on specified ports, and so forth.

This disclosure describes, in part, techniques for providing an efficient wireless connection experience. Also disclosed are techniques for maintaining connectivity between the device and a connection server such that the connection server may initiate communication with the device.

A wireless connectivity module facilitates the efficient wireless connection experience. This module is configured to locate wireless networks, generate a set of located wireless networks, test those wireless networks, and connect to and use networks that are available. Executable network plug-ins may be provided as part of the wireless protocol stack. A particular network or network type is associated with an executable network plug-in. This executable network plug-in is configured to, when executed, configure and establish a network connection with that particular network.

When no network associated with a particular executable network plug-in is present or available, additional testing on other located networks may take place. Testing may include determining connectability, attempting a domain name service (DNS) lookup, attempting retrieval of a known reference data from a server, and so forth. Networks may be categorized as open, accessible, unusable, or captive in some instances. An open network has no restrictions for connection. That is, this type of network does not request authentication from a device or user before connecting with the device. An accessible network is one which is accessible via an executable network plug-in or which has previously been configured.

An unusable network is unsuitable for connection by the user, such as a locked and encrypted WLAN. The unusable network may be usable to another user, such as one with an appropriate executable network plug-in. In the case of a captive network, some form of connectivity is available; however some user interaction may be required. For example, a hotel WLAN which requires a user enter a room number and/or other information to establish connectivity may be considered "captive."

Connections are established with accessible or open networks without requiring user intervention or selection. For example, a user which is in range of an accessible or open network will be connected to that network without prompt when network connectivity is called for. Similarly, the process for connecting to the captive network is facilitated by presenting the user with an option to connect to that captive network. The device may also be configured to present a web browser or other client application upon an attempt to connect to a captive network, thus allowing the user to view a login screen and determine whether to continue the attempt to use the captive network, and enter information required to do so.

Once connected to a network, wired or wireless, the device may transmit one or more packets or datagrams to a connection server. As used herein, a packet denotes a parcel of information in a stateful connection, such as that used by transmission control protocol (TCP), while a datagram indicates a parcel of information in a stateless connection, such as the user datagram protocol (UDP). The device may be configured to transmit the parcels such that an inbound connection pathway to the device is maintained through one or more network devices. In some implementations, this parcel may be transmitted periodically, with the timing configured such that the inbound connection pathway is maintained while minimizing traffic. Furthermore, in some implementations the UDP or another stateless protocol may be used to minimize loading and resource consumption on the connection server.

The parcel of information also provides information to the connection server about the electronic device. For example, this parcel of information may provide a device identifier, session token, or the like that specifies which electronic device is originating the parcel. The parcel also implicitly or explicitly provides a network address associated with the device.

The connection server may use the information within the parcel to initiate a connection with the server. For example, a software update such as a set of new executable network plug-ins for the electronic device may be present on the connection server. The connection server may initiate a connection with the electronic device using the most current information received in the parcel from the electronic device. The connection server is able to reach the electronic device because the periodic transmission of parcels from the device has maintained an open inbound pathway through the network devices.

The techniques described herein may be implemented by an electronic device with a processor, network interface, and external memory, such as an electronic book (eBook) reader device or any other type of electronic device. The device, such as the eBook reader device, incorporates at least one processor executing an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, Google Corporation's Android, and Wind River Systems Inc.'s VxWorks® operating systems.

The example eBook reader device discussed herein may incorporate a processor from Freescale Semiconductor Inc. of Austin, Tex. using an i.MX architecture and executing a Linux® kernel. The kernel may use a device driver to communicate with peripherals such as an external memory interface ("EMI"), Universal Serial Bus ("USB") controller, image processing unit ("IPU"), wired network interface, wireless network interface, and so forth. These peripheral devices may reside on the same "chip" or die as the processor as in the case of the i.MX architecture, be on another die, or a combination of the same die and another die. A configuration where one or more processors and associated peripherals are on the same die may be known as a "system on a chip" ("SOC").

Other architectures including processors may also be used. For example, some of these architectures include the Open Multimedia Application Platform ("OMAP") from Texas Instruments Inc. of Dallas, Tex.; Marvell platform from Marvell Technology Group Ltd. of Santa Clara, Calif.; the x86 platform from Intel Corporation of Santa Clara, Calif.; the MIPS platform from MIPS Technologies Inc. of Sunnyvale, Calif.; and so forth.

While this disclosure describes providing an efficient wireless experience in terms of an eBook reader device, the concepts described herein may also be applicable to other devices such as cellular telephones, portable media players, desktop computers, laptops, tablet computers, medical devices, servers, netbooks, servers, personal digital assistants, desktop computers, and so forth.

Illustrative eBook Reader Device

Figure 1:
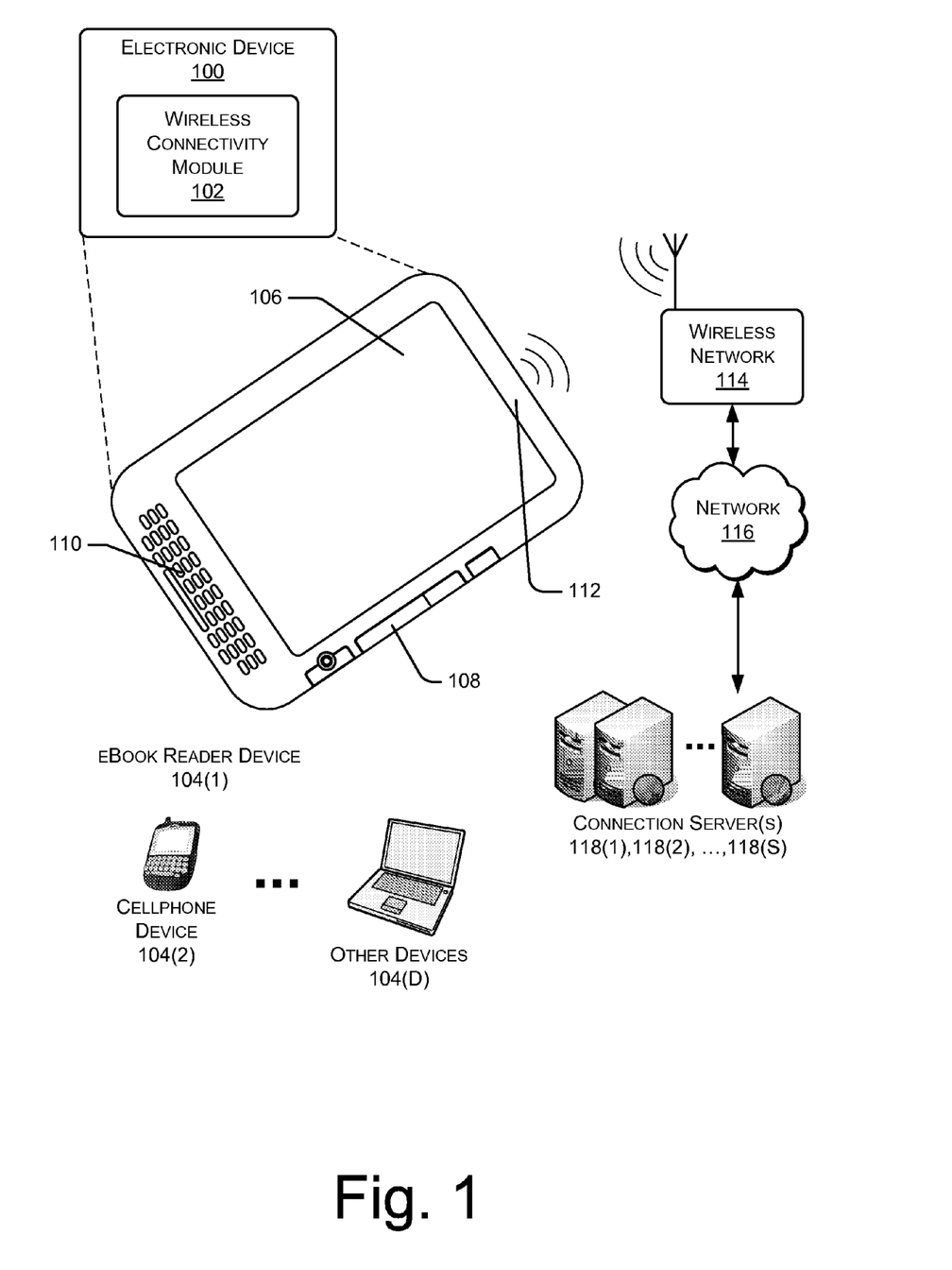
FIG. 1 is an illustrative electronic device configured with a wireless connectivity module that provides an efficient wireless connection experience to a user.

FIG. 1 is an illustrative electronic device 100 configured to provide an efficient connection experience and maintain connectivity by way of a wireless connectivity module 102. The wireless connectivity module 102 provides instructions that, when executed, provide for connection with networks with no or minimal user intervention.

Several devices are shown in this illustration that may utilize the wireless connectivity module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the wireless connectivity module 102. As used herein, letters within parentheses such as "(D)" indicate an integer number greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The eBook reader device 104(1) may also incorporate a keypad that includes one or more actuable controls 108 and a keypad 110 for user input. The one or more actuatable controls 108 may have dedicated or assigned operations. For instance, the actuable controls 108 may include a joystick, page turning buttons, navigational keys, a power on/off button, selection keys, touchpad, and so on. Furthermore, the keypad may include any other controls configured to receive any other sort of user input via buttons, touch screen inputs, or the like.

The eBook reader device 104(1) also incorporates a wireless networking interface 112. The wireless networking interface 112 allows for communication via a wireless network, and may support one or more wireless networking technologies. For example, the wireless networking interface 112 may support WiFi, WiMAX, 3G, 4G, and so forth. The wireless networking interface 112 may comprise one or more modems, radios, and so forth.

A wireless network 114 is shown in communication with the wireless networking interface 112 of the eBook reader device 104(1). The wireless network 114 may incorporate one or more network devices between itself and an external network, such as network 116. The network 116 is representative of any one or combination of multiple different types of networks, such as the Internet, cable networks, cellular networks, and so forth.

One or more connection server(s) 118(1), 118(2), . . . 118(S) connect to the network 116. The connection servers 118(1)-(S) are configured to maintain executable connectivity plug-ins, monitor inbound parcels of data from the electronic devices 104(1)-(D), and establish communication with one or more of those electronic devices 104(1)-(D) upon request. This request may originate from an automated process, a user request, and so forth. The servers 118(1)-(S) may be embodied in any number of ways, including as a single server, a cluster of servers, a server farm or data center, and so forth, although other server architectures (e.g., mainframe) may also be used.

Figure 2:
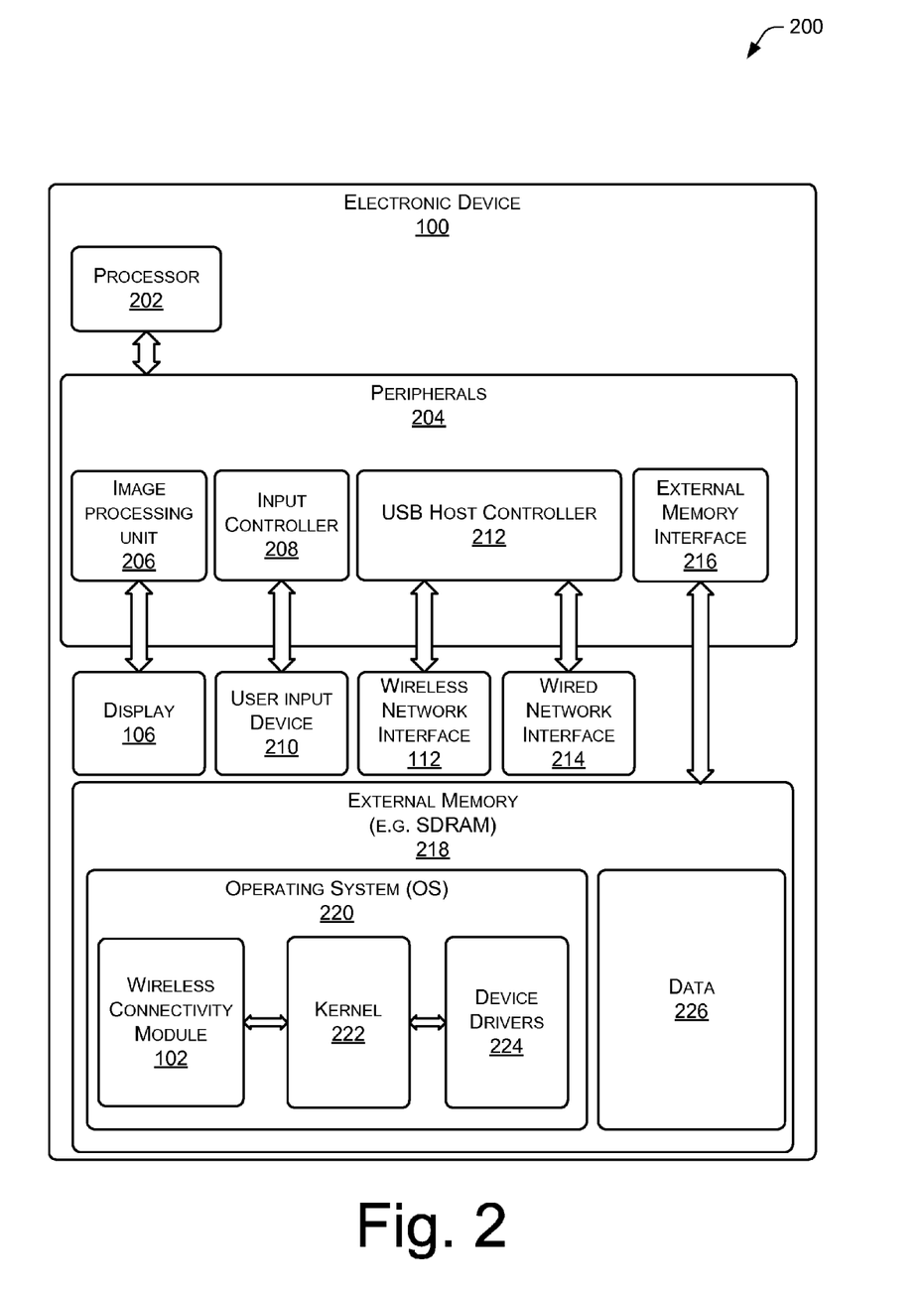
FIG. 2 is an illustrative schematic of an electronic device configured to use the wireless connectivity module.

FIG. 2 illustrates selected functional components 200 that might be implemented in the electronic device 100. In a very basic configuration, the device 100 includes one or more processors 202. Each processor 202 may itself comprise one or more processors.

One or more peripherals 204 may couple to the processor 202. For instance, FIG. 2 illustrates an image processing unit 206 coupled to the display 106. In some implementations, multiple displays may be present and coupled to the image processing unit 206. In some implementations, one or more image processing units 206 may couple to multiple displays.

Coupled to processor 202 may be an input controller 208. The input controller 208 may be configured to accept input from a user input device 210, such as a touch screen, mouse, user actuable controls 108, and so forth. In some implementations the user input device 210 may be coupled to a USB host controller 212.

FIG. 2 also illustrates that the electronic device 100 may include the USB host controller 212. The USB host controller 212 manages communications between devices attached to a universal serial bus ("USB") and the processor 202 and other peripherals. The wireless network interface 112 couples to the USB host controller 212 via the universal serial bus. The wireless network interface 112 is configured to provide connectivity to a wireless network, either local, metropolitan, or wide-area. A wired network interface 214 may also provide connectivity via a physical connection such as an electrical conductor, fiber optic cable, and so forth.

An External Memory Interface ("EMI") 216, which in turn couples to external memory 218, also couples to processor 202. The EMI 216 manages access to data stored in the external memory 218. The external memory 218 may comprise Static Random Access Memory ("SRAM"), Pseudo-static Random Access Memory ("PSRAM"), Synchronous Dynamic Random Access Memory ("SDRAM"), Double Data Rate SDRAM ("DDR"), or other computer-readable storage media.

The external memory 218 may store any number of functional components that are executable on the processor 202. Thus, the external memory 218 may store an operating system 220 comprising a kernel 222 operatively coupled to one or more device drivers 224. Data 226 including content items such as eBooks may also be stored within the external memory 218. The kernel 222 may also couple to the wireless connectivity module 102, as introduced above with respect to FIG. 1. In some implementations, the wireless connectivity module 102 may be internal to the kernel 222, one or more device drivers 224, or both.

The electronic device 100 may also include other non-illustrated peripheral devices. These other devices may include a Firewire bus, camera, global positioning system, Bluetooth™ wireless interface, PC Card component, hard drive which may use magnetic or optical memory on spinning disks or solid state storage, and so forth.

Couplings, such as that between the kernel 222 and the device drivers 224, are shown for emphasis. There are couplings between many of the components illustrated in FIG. 2, but graphical arrows are omitted for clarity of illustration.

Figure 3:
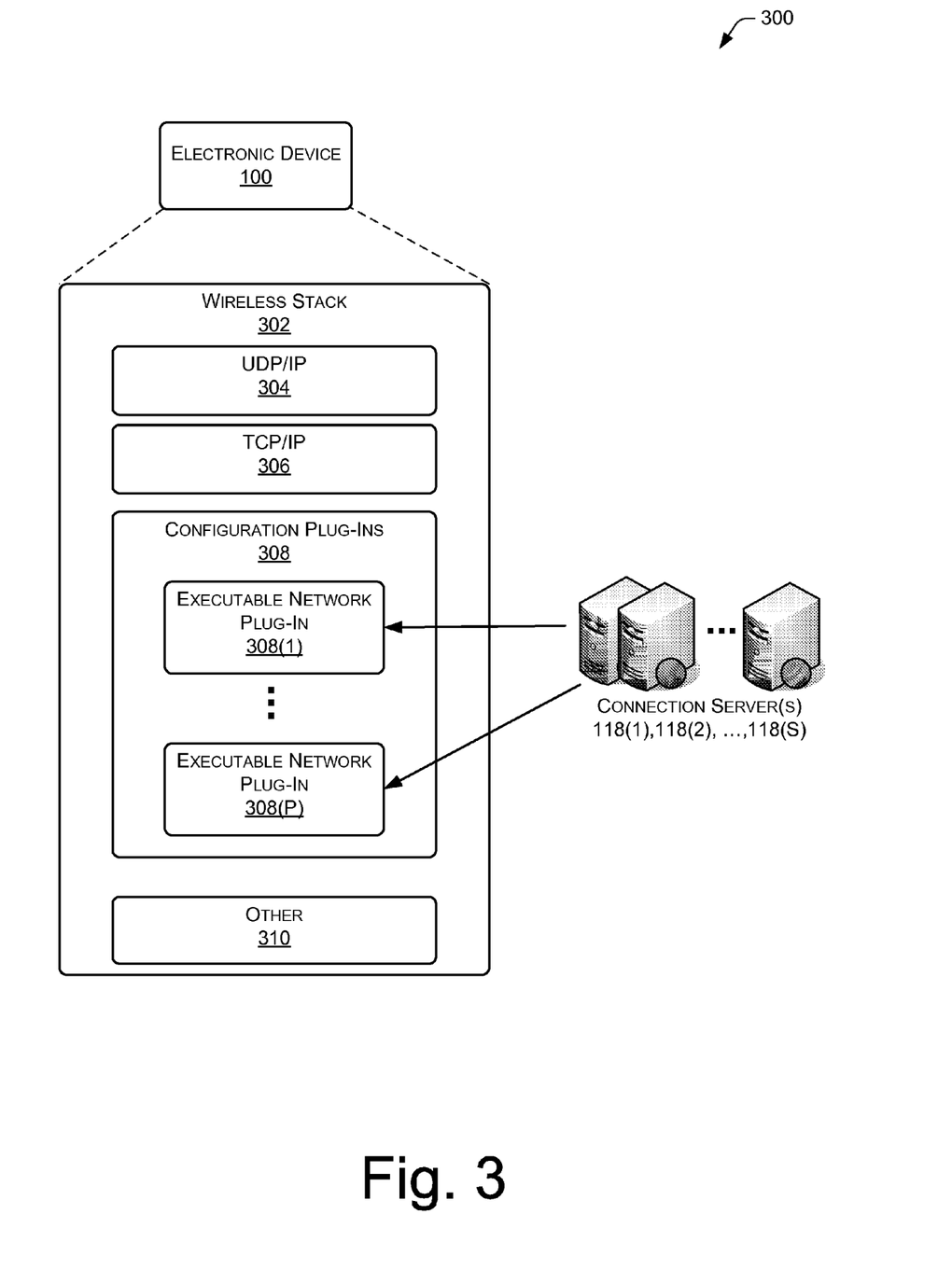
FIG. 3 is an illustration of an example configuration of a wireless protocol stack and a set of network configuration plug-ins used by the wireless connectivity module.

FIG. 3 is an illustration of an example configuration 300 of a wireless stack. Electronic device 100 includes a wireless stack 302 configured to establish and maintain connectivity with resources via the wireless network interface 112. The wireless stack may include a user datagram protocol (UDP) via internet protocol (IP) component 304. This component generates stateless UDP datagrams, such as may be used for parcels of information sent to the connection servers 118(1)-(S). A UDP datagram does not guarantee reliability, ordering, or integrity of the data. As such, it provides a good lightweight protocol for sending parcel information from the electronic device 100 to the connection servers 118(1)-(S), without burdening the connection servers 118(1)-(S) with the overhead of maintaining TCP connections, as described below.

When a stateful connection is called for, a transmission control protocol (TCP) component 306 may be used. TCP provides, among other features, error correction capabilities at the network interface level, and provides for reliable, ordered delivery of data between devices. As a result, TCP is more resource intensive than UDP in terms of connection setup, maintenance, and teardown.

The wireless stack 302 may also include executable network plug-ins 308(1), 308(2), . . . , 308(P). The executable network plug-ins provide for configuration and connection information and components called for by a wireless service provider (WSP). For example, a WSP may provide internet access on a network named "Bell" to subscribers via WiFi hotspots distributed around the country. To prevent non-subscribers from accessing the network, the ISP may require connection using specific connection and encryption protocols. An executable network plug-in 308 may be configured to allow electronic device 100 to connect via this network. The executable network plug-in 308 may comprise a compiled executable program, a script, virtual machine code, or the like.

The executable network plug-in 308 may also provide other functions which are tailored to the particular network. For example, the network plug-in may be configured to provide special quality-of-service handling for voice-over-IP (VOIP) traffic, provide special geolocation features, avoid use of particular network ports based on prior knowledge of the particular network's packet-filtering characteristics, and so forth.

The wireless stack 302 may also include other components 310. For example, these components may include simple mail transfer protocol, point-to-point protocol, and so forth.

Illustrative Process for Efficient Network Connectivity

Figure 4:
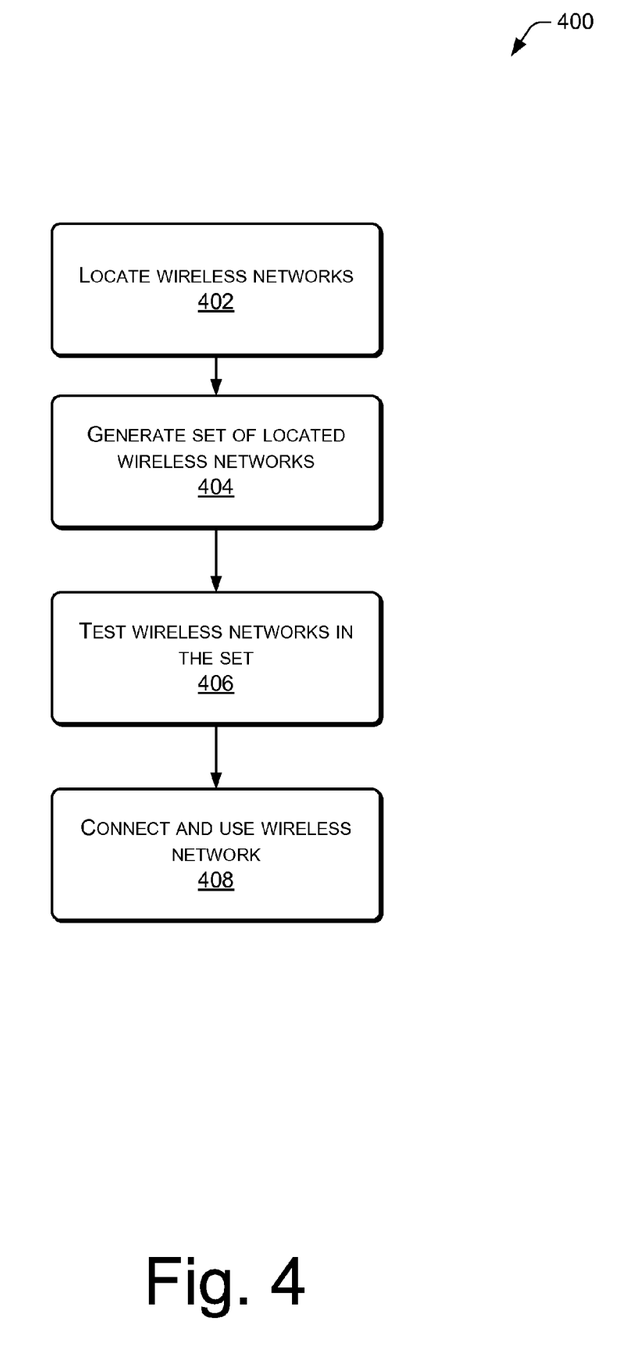
FIG. 4 is an illustrative flow diagram of a process of providing an efficient wireless connection experience using the wireless connectivity module, which efficiently locates and connects to various wireless networks.
Figure 5:
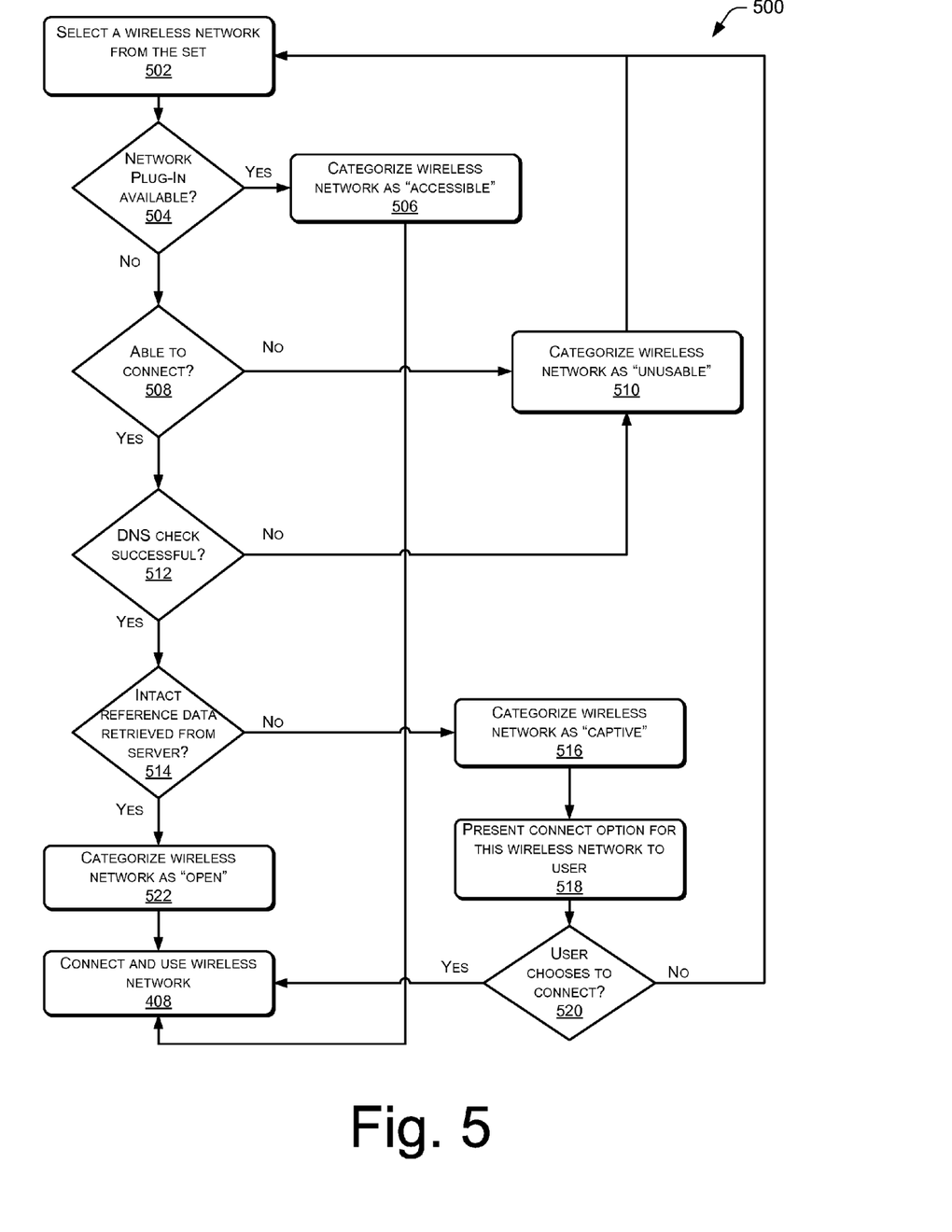
FIG. 5 is an illustrative flow diagram of a process of testing wireless networks that have been located.
Figure 7:
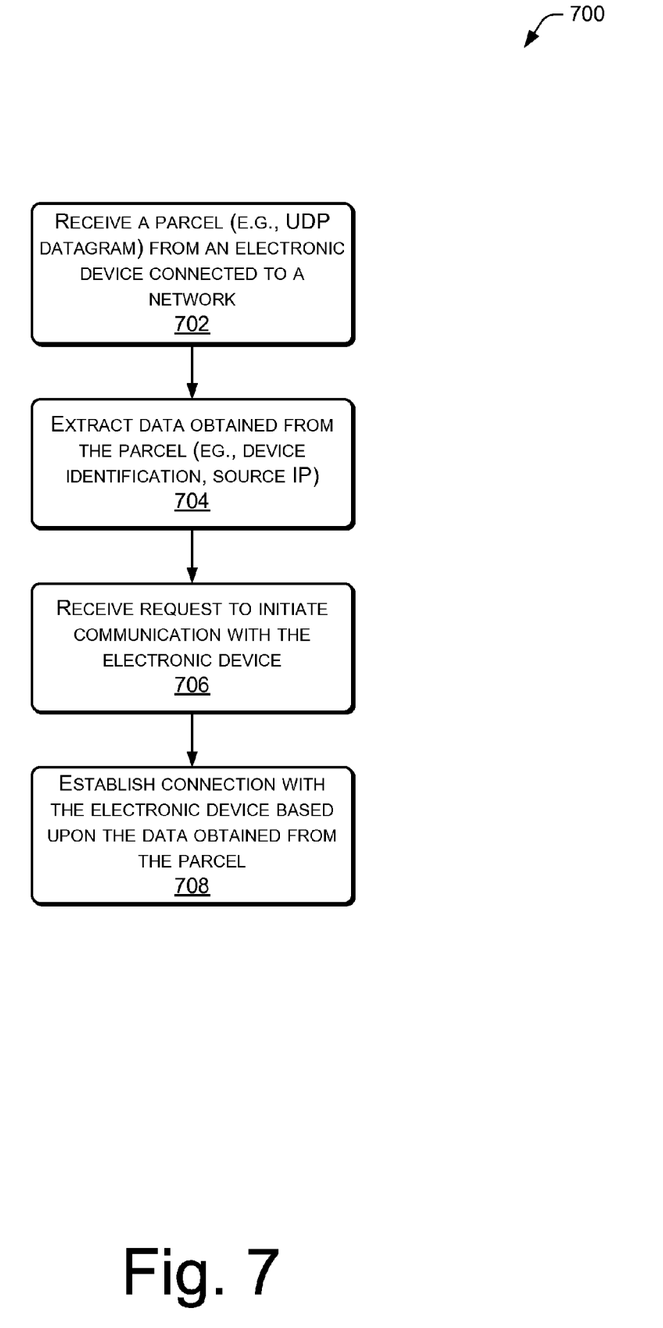
FIG. 7 is an illustrative flow diagram of a process of a connection server maintaining connectivity with an electronic device.

FIGS. 4, 5 and 7 illustrate example processes 400, 500, and 700 that may be implemented by the architecture of FIGS. 1-3 or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 4 is an illustrative flow diagram of a process 400 of providing an efficient wireless connection experience, including locating and connecting to wireless networks. Block 402 locates wireless networks within range of the wireless networking interface 112. These wireless networks may be located by monitoring channels available to one or more radios within the wireless networking interface 112. For example, a beacon frame may be received from a WiFi network which contains information about the wireless network. In other implementations, or in combination with beacons, wireless data transmissions may be monitored and network information derived therefrom.

Some networks may not broadcast beacon frames, and may be "quiet," precluding their detection by monitoring. In some implementations, a location or geolocation of the electronic device 100 may be used to determine wireless networks that should be accessible. Thus, wireless networks may be determined through detection, by comparison with a pre-defined datastore, or combination thereof.

Block 404 generates a set of located wireless networks. For example, the set may include a list of individual WLAN, WMAN, WWANs. Block 406 tests at least a portion of the wireless networks in the set. The tests may include determining connectability, performing DNS lookups, retrieving a known reference data, and so forth. The testing is described in more detail below with regards to FIG. 5. As a result of the testing, the wireless networks within the set are categorized as being accessible, open, captive, or unusable.

Block 408 uses the test results to connect and use one or more of the wireless networks that have been tested as accessible, open, or captive. In some implementations, preference may be given to a particular sequence of use. For example, it may be preferred to use accessible networks first, then open, then captive. In other implementations the preferences may be altered. For example, to reduce traffic on an accessible network, preference may be made to use open networks, than accessible networks, than captive networks. The user, an administrator, or a combination thereof may choose the preferences. These preferences may be distributed across all or a portion of the electronic devices 100 served by the connection servers 118(1)-(S), or may be individually configured to a particular electronic device 100. Furthermore, the preferences may be dynamically adjusted. For example, a WLAN network may be given priority over a WMAN or WWAN network when use of the WLAN network would result in lower power consumption.

FIG. 5 is an illustrative flow diagram of a process 500 of testing wireless networks that have been located. Block 502 selects a wireless network from the set of located wireless networks. Block 504 compares the wireless network with available network plug-ins 308(1)-(P). When at 504 a network plug-in 308 is available, block 506 categorizes the network as "accessible" and continues to block 408 to connect and use the wireless network.

When at 504 the network plug-in 308 is not available for the wireless network, block 508 tests for connectability. For example, this test for connectability may include attempting to associate with an access point. When unable at block 508 to connect, block 510 categorizes the wireless network as "unusable" and returns to block 502 to select another wireless network from the set.

When block 508 is able to connect, block 512 checks domain name service (DNS) or other network services. For example, a DNS lookup may be requested for a combination of domain name and network address known to the electronic device 100. Upon receiving a response to the DNS lookup that corresponds to that known to the electronic device, the DNS check may be considered successful.

When the DNS check 512 is unsuccessful, block 510 categorizes the wireless network as "unusable." When the DNS check 512 is successful, block 514 attempts to retrieve reference data, or file with known characteristics, from a server. For example, the reference data may be a file present on the connection servers 118(1)-(S), a portion of the contents of a file such as a web page, and so forth.

When, at block 514, the attempt to retrieve the reference data intact fails, block 516 categorizes the wireless network as "captive." The reference data is considered intact when one or more characteristics of the reference data match a pre-determined value or meet a check of internal consistency.

Passage through a proxy server or other network device may entirely block or modify the reference data. This may occur, for instance, in a hotel where users may freely connect, but receive a hotel-specific page in a web browser upon initial connection. This hotel-specific page may provide terms and conditions of use, prompt for entry of hotel password, and so forth. Regardless of the specific contents, a reference data modified by the hotel's intervening network devices differs from the reference data expected from the connection server, indicating that the wireless network is altering or otherwise affecting traffic, and is thus captive.

Block 518 may then present a connection option to the user for the captive network. This connection option may be in the form of a specific user control, presentation of a web page in a browser, and so forth. Block 520 accepts the user's choice of connection option. When the user chooses not to connect, block 502 selects another wireless network from the set. In some implementations this network may also be categorized as "unusable" or "do not use." In these implementations, the "do not use" category may indicate that the device will avoid attempting a connection with again, for a predetermined or indefinite amount of time. When block 520 accepts the user's choice to connect to the captive network, block 408 connects and uses the wireless network.

Returning to 514, when the reference data is retrieved intact, block 522 categorizes the wireless network as "open." Block 408 may then connect and use this "open" wireless network.

The process 406 of testing wireless networks may be initiated periodically, at a pre-determined time, upon a pre-determined event, and so forth. Furthermore, categorization of networks may change over time. For example, a WiFi network may be inaccessible until a new network plug-in 308 is obtained from the connectivity service 118.

Thus, except for the presentation of the connection option for the captive wireless networks at block 518, the process of locating, testing, and connecting occurs without user intervention. Thus, the wireless connectivity module 102 spares the user from the frustration of finding, selecting, configuring, and attempting to connect to wireless networks.

Figure 6:
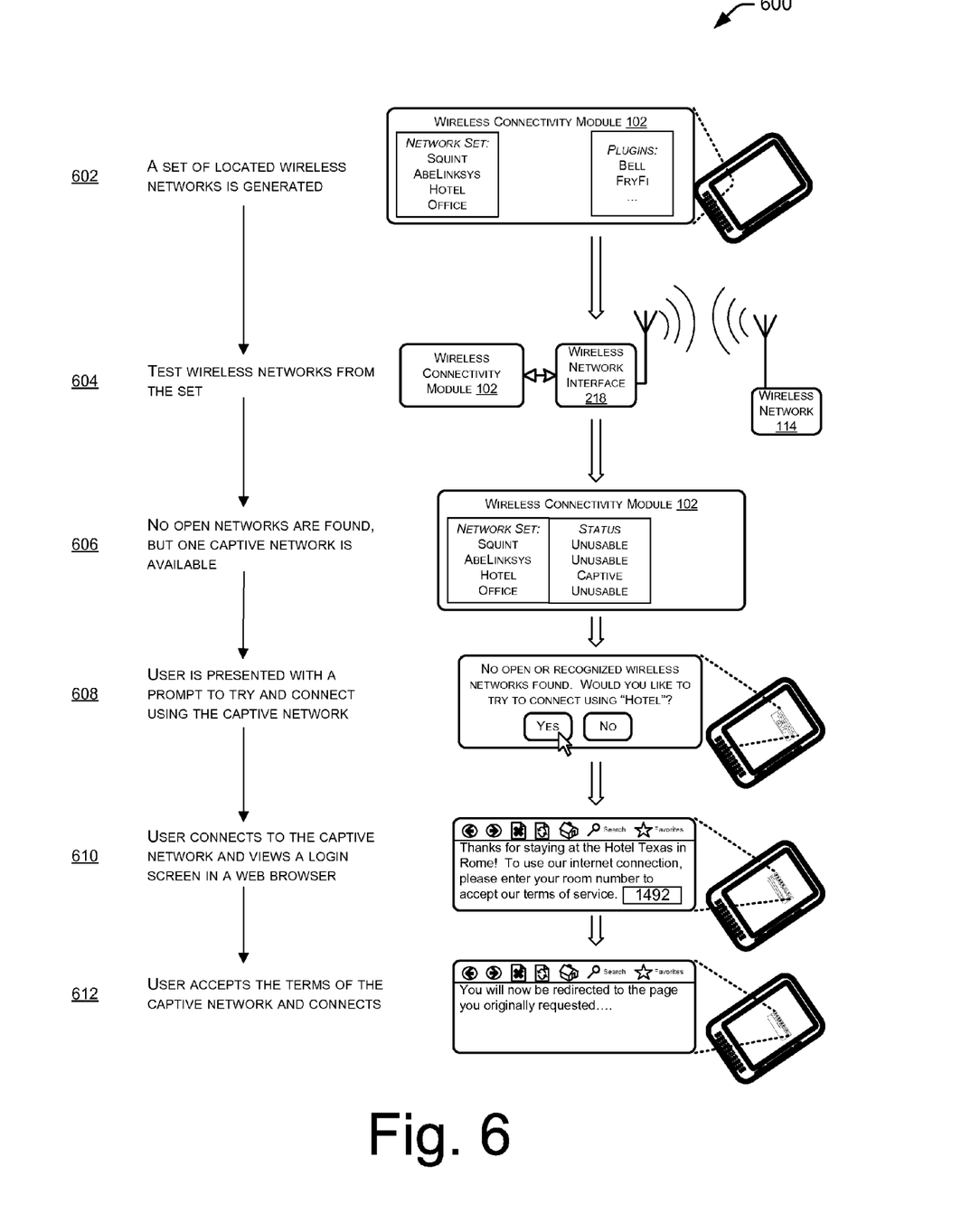
FIG. 6 is an illustrative process of establishing a wireless connection using the techniques described below.

FIG. 6 is an illustrative process 600 of one example of establishing an efficient wireless connection using the wireless connectivity module 102. Operation 602 shows a set of located wireless networks generated by the wireless connectivity module 102 of the eBook reader device 104(1). As shown here, the network set includes the following wireless networks: "Squint," "AbeLinksys," "Hotel," and "Office." Also available are plug-ins for two networks, "Bell" and "FryFi."

Operation 604 depicts testing the wireless networks from the set. This testing may occur as described above with regards to FIG. 5. Accessible networks for which network plug-ins 308 are available are connected to, and when no accessible networks are available, other located wireless networks are tested to find open and captive networks.

As a result of the testing, operation 606 shows that no open networks are present, but that one captive network named "Hotel" is available. Operation 608 presents the user with a prompt to try and connect using the captive network. For example, this may be a prompt for a username and password, room number, and so forth. Upon accepting the prompt to connect, operation 610 connects to the captive network, opens a web browser, and presents a login screen in the browser. For example, as shown here, the user may see a prompt for the Hotel Texas in Rome, Italy, which asks for the user's room number.

Operation 612 shows the browser after the user enters the room number "1492" and accepts the terms of use. A redirection notice is presented, to the user, and the eBook reader device 104(1) may now utilize the captive network for connectivity.

FIG. 7 is an illustrative flow diagram of a process 700 of a connection server maintaining connectivity with the electronic device 100. Block 702 receives a parcel from the electronic device 100 via the network 116. The parcel may be a UDP datagram, TCP packet, and so forth.

The electronic device 100 may be configured to attempt transmission of the parcel via several different ports, change protocols from UDP to TCP, and so forth. In one implementation, the device 100 may utilize "DNS masquerading" to wrap the parcels in what data which appear to be domain name service (DNS) requests. Network devices are frequently configured to permit DNS requests to pass, and thus the parcel would be able to communicate with the connection server.

The wireless connectivity module 102 on the electronic device 100 is configured to send the parcel at either a pre-determined interval or when a pre-determined condition has been met. The transmission of the parcel from the electronic device 100 to the connection servers 118(1)-(S) provides information such as network address, while also opening an inbound pathway through network devices.

The pre-determined interval is configured to maintain an inbound connection pathway through one or more intervening network devices. For example, a firewall may be configured to close connections idle for more than 30 seconds. Thus, the pre-determined interval may be configured to some value less than 30 seconds, such at 29 seconds. By sending a parcel every 30 seconds via the network connection, the connection through the firewall remains open, maintaining an inbound pathway for the connection servers 118(1)-(S) establish communication with the electronic device 100.

In some implementations the connection servers 118(1)-(S) may maintain a datastore of pre-determined intervals for given networks. Thus, the connection servers 118(1)-(S) may provide the pre-determined interval appropriate to the given network to the electronic device 100.

In another implementation, the connection servers 118(1)-(S) may receive an initial parcel from the electronic device 100, and begin transmitting periodic parcels to the electronic device 100. Eventually, a network device may block this connection. The electronic device 100 may be configured to send a new parcel to the connection servers 118(1)-(S) when a pre-determined period of time has passed without receiving a parcel.

The pre-determined interval, pre-determined period of time, or combinations thereof may be dynamically adjusted either independently by the electronic device 100, the connection servers 118(1)-(S), or both in coordination. For example, the pre-determined interval may be progressively incremented until the connection fails, and then adjusted back to a previous known working value.

Block 704 extracts data from the parcel, such as the source network address, device identifier, session token, and so forth. This extracted data may then be stored and retrieved for later use.

In some implementations, a geolocation associated with the parcel may be obtained and stored. The geolocation may be used in some implementations to ascertain what network plug-ins 308 may be appropriate for transmission to the electronic device 100. For example, when the geolocation indicates the electronic device 100 is Houston, Tex., network plug-ins 308 for that area may be provided to the electronic device 100.

Block 706 receives a request to initiate communication with the electronic device 100. For example, the connection servers 118(1)-(S) may determine that additional executable network plug-ins 308 are to be sent to the electronic device 100, and trigger a request for connection.

Block 708 establishes a connection with the electronic device 100 based at least in part upon data obtained from the parcel. For example, the connection servers 118(1)-(S) may use the source network address of the parcel sent by the electronic device 100 as a destination network address when establishing the connection. Furthermore, because the electronic device 100 has been configured to keep a pathway open, the data traffic inbound to the electronic device 100 is able to transit the network devices.

Figure 8:
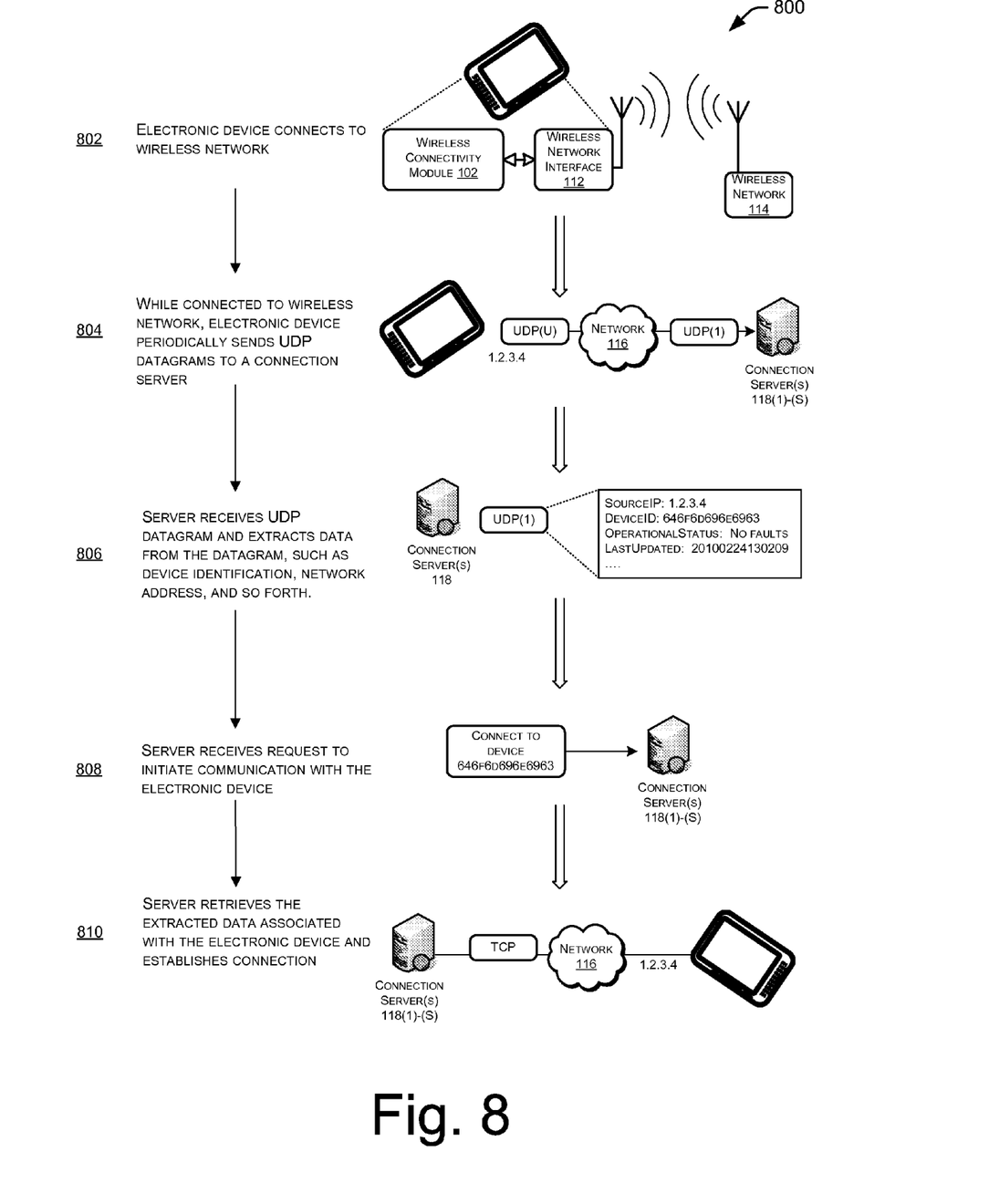
FIG. 8 is an illustrative process of the connection server maintaining connectivity with the electronic device such that the server may initiate communication with the device.

FIG. 8 is an illustrative process 800 of the connection server maintaining connectivity with the electronic device 100 such that the connection server may initiate communication with the device.

Operation 802 depicts the electronic device connecting to the wireless network 114. Operation 804 shows the device sending one or more parcels, such as UDP datagrams, via the network 116 to the connection servers 118(1)-(S). These parcels provide information to the connection servers 118 and maintain an inbound connection pathway.

Operation 806 depicts the connection servers 118(1)-(S) receiving the datagram and extracting data from a datagram parcel. This data may include a device identifier, network address, device operational status, and so forth. For example, as shown here data extracted from a first UDP datagram UDP(1) includes a source IP address of 1.2.3.4, a device identifier of 646f6d696e6963, an operational status indicator showing that no faults are present on the device, and so forth. The payload of the datagram may contain other information about the device, such as a software/firmware version number, metrics of user usage of the device, and so forth.

Other information may also be determined from the electronic device's 100 interaction with the connection server 118. For example, a timestamp indicating when the last UDP packet was received may be recorded, whether the inbound connection pathway is available, and so forth.

Operation 808 shows the connection server 118 receiving a request to initiate communication with the electronic device. This request may be for a specific device, for example device 646f6d696e6963 as shown here, or for a set of devices, such as all devices with a particular firmware version, operational status, and so forth.

Operation 810 depicts the connection servers 118(1)-(S) retrieving the extracted data associated with the electronic device 100 and establishing a connection. For example, given the request to connect to device 646f6d696e6963, a connection may be initiated with that electronic device 100. For example, the connection may be established using UDP via the same ports previously opened. This connection may use the network address 1.2.3.4 extracted from the UDP datagram from the device as the destination, and use the inbound connection pathway through network devices to the destination which was maintained by the stream of UDP datagrams sent by the electronic device 100.

Once the connection is established, the connection servers 118(1)-(S) or another server may communicate with the electronic device 100. This communication may include transmitting configuration files, receiving diagnostic data, updating executable network plug-ins 308, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A system comprising:
a memory;
a wireless network interface;
one or more processors coupled to the memory and the wireless network interface;
a plurality of instructions stored in the memory and executable by the one or more processors to:
locate one or more wireless networks;
generate a set of the located one or more wireless networks;
test the one or more wireless networks in the set by determining if a network plug-in corresponding to one of the located wireless networks in the set is available;
use the network plug-in to connect to the one of the wireless networks corresponding to the network plug-in based at least in part on determining that the network plug-in is available;
based at least in part on determining that no network plug-in is available, perform a secondary test to connect to one of the one or more wireless networks
based at least in part on performing the secondary test, connect to one of the one or more wireless networks; and
transmit to a connection server via the connected wireless network information identifying the system.

2. The system of claim 1, wherein the transmission to the connection server occurs periodically at pre-determined intervals.

3. The system of claim 2, wherein the pre-determined interval is configured such that an inbound connection pathway to the system is maintained through one or more intervening network devices.

4. The system of claim 3, wherein the pre-determined interval is retrieved, at least in part, from the connection server.

5. The system of claim 3, wherein the pre-determined intervals are adjusted dynamically.

6. The system of claim 3, wherein the one or more intervening network devices comprise:
a firewall;
network address translation device;
a proxy server; or
a router.

7. The system of claim 1, wherein the secondary test comprises:
selecting a wireless network from the set;
when an attempt to connect to the selected wireless network fails, categorizing the selected wireless network as unusable and testing a next wireless network from the set;
when the attempt to connect to the selected wireless network succeeds:
when a domain name service check fails, categorizing the selected wireless network as unusable and testing the next wireless network from the set;
when the domain name service check succeeds, attempting to retrieve the reference data from the connection server;
when the reference data is retrieved in an unmodified state, categorizing the selected wireless network as open and connecting and using the selected wireless network;
when the reference data is unretrievable or is retrieved in a modified state, categorizing the selected wireless network as captive and presenting a connection option for the selected wireless network to a user;
when the user declines to connect, testing the next wireless network from the set; and
when the user accepts the connection option, attempting to connect with the selected wireless network.

8. The system of claim 1, wherein testing the one or more wireless networks in the set further comprises retrieving reference data over the one or more wireless networks, wherein the reference data comprises a file.

9. The system of claim 1, the plurality of instructions being further executable to:

receive from the connection server or a device in communication with the connection server a request for connection based at least in part upon data in the information identifying the system.

10. The system of claim 1, embodied as an electronic book reader device.

11. A system comprising:
a memory;
a network interface;
one or more processors coupled to the memory and the network interface;
a plurality of instructions stored in the memory and executable by the one or more processors to:
receive multiple transmissions of information from an electronic device via the network interface at a pre-determined interval configured to maintain a connection pathway with the electronic device through one or more intervening network devices, wherein the pre-determined interval may be dynamically adjusted;
extract a source network address associated with the device from the information; and
store the extracted source network address.

12. The system of claim 11, wherein the received information comprises a stateless datagram or a stateful packet.

13. The system of claim 11, wherein the plurality of instructions are further executable to store at least a portion of the received information.

14. The system of claim 11, wherein the plurality of instructions are further executable to:
establish a connection via the connection pathway with the electronic device.

15. The system of claim 11, wherein the plurality of instructions are further executable to:
provide to the electronic device via the connection one or more network plug-ins configured to allow the electronic device to connect to one or more wireless networks.

16. The system of claim 15, wherein the network plug-ins are executable by a processor of the electronic device to connect the electronic device to a wireless network.

17. The system of claim 16, wherein the network plug-ins comprise compiled executable programs, scripts, or virtual machine code.

18. The system of claim 11, wherein the plurality of instructions are further executable to:

receive a request to initiate communication with the electronic device; and
establish a connection via the connection pathway with the electronic device based at least in part upon the source network address extracted from the received information.

19. The system of claim 18, wherein the connection utilizes a transmission control protocol.

20. The system of claim 18, wherein the connection utilizes a user datagram protocol.

21. One or more computer-readable storage media storing instructions that, when executed by one or more processors, cause the one or more processors of an electronic device to perform acts comprising:
locating one or more wireless networks;
determining an access status of the one or more located wireless networks, based at least in part on determining whether an executable network plug-in corresponding to one of the located wireless networks is available;
connecting to one of the wireless networks corresponding to the executable network plug-in based at least in part on determining that the executable network plug-in is available; and
transmitting to a connection server and via the connected wireless network data identifying the electronic device, wherein the transmitting comprises periodically sending the data at an interval configured to maintain an inbound connection to the electronic device through one or more intervening network devices between the electronic device and the connection server.

22. The computer-readable storage media of claim 21, the data further comprising a user datagram protocol (UDP) datagram.

23. The computer-readable storage media of claim 21, wherein determining the access status of the one or more located wireless networks includes determining whether the access status is at least one of accessible, open, or captive.

24. The computer-readable storage media of claim 23, wherein the wireless network is open when access to the wireless network is unrestricted.

25. The computer-readable storage media of claim 23, wherein the wireless network is captive when limited connectivity is available and additional interaction is required for access.

* * * * *